US008704896B2

(12) United States Patent
Nijemcevic et al.

(10) Patent No.: US 8,704,896 B2
(45) Date of Patent: Apr. 22, 2014

(54) CAMERA-BASED SCANNING (71) Applicant: Microsoft Corporation, Redmond, WA (US)

(72) Inventors: Djordje Nijemcevic, Belgrade (RS); Magdalena Vukosavljevic, Belgrade (RS); Milan Vugdelija, Belgrade (RS); Ana Mitrovic, Belgrade (RS); Georg F. Petschnigg, Seattle, WA (US); Bodin Dresevic, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 13/677,117

(22) Filed: Nov. 14, 2012

(65) Prior Publication Data

US 2013/0070122 A1 Mar. 21, 2013

Related U.S. Application Data (63) Continuation of application No. 12/578,445, filed on Oct. 13, 2009, now Pat. No. 8,345,106.

(60) Provisional application No. 61/245,278, filed on Sep. 23, 2009.

(51) Int. Cl.
*H04N 5/225* (2006.01)
*H04N 5/228* (2006.01)
*H04N 5/222* (2006.01)

(52) U.S. Cl.
USPC ............. 348/207.1; 348/222.1; 348/333.11; 382/282

(58) Field of Classification Search
None
See application file for complete search history.

(56) References Cited

U.S. PATENT DOCUMENTS

| | | | |
|---|---|---|---|
| 6,094,508 A * | 7/2000 | Acharya et al. | 382/199 |
| 7,123,292 B1 | 10/2006 | Seeger | |
| 7,301,564 B2 | 11/2007 | Fan | |
| 7,453,614 B2 | 11/2008 | Gagliano | |
| 7,499,588 B2 | 3/2009 | Jacobs | |
| 7,551,782 B2 | 6/2009 | Haim Lev | |
| 8,345,106 B2 | 1/2013 | Nijemcevic | |
| 2005/0169531 A1 | 8/2005 | Fan | |
| 2005/0179787 A1* | 8/2005 | Webb | 348/222.1 |

(Continued)

FOREIGN PATENT DOCUMENTS

| | | |
|---|---|---|
| KR | 20060050729 | 5/2006 |
| KR | 20080028183 | 3/2008 |
| WO | WO-2006055543 | 5/2006 |

OTHER PUBLICATIONS

"Non-Final Office Action", U.S. Appl. No. 12/578,445, (Feb. 24, 2012), 21 pages.
"Notice of Allowance", U.S. Appl. No. 12/578,445, (Aug. 31, 2012), 6 pages.
"PCT Search Report and Written Opinion", Application No. PCT/US2010/047061, (Apr. 27, 2011), 9 pages.

(Continued)

*Primary Examiner* — Justin P Misleh
(74) *Attorney, Agent, or Firm* — Micah Goldsmith; Glen Johnson; Micky Minhas (57) ABSTRACT

Embodiments of camera-based scanning are described. In various embodiments, one or more quadrangular objects are automatically selected from a captured image for scanning. The automatic selection is determined to be successful based on the selected quadrangular objects having an associated score that exceeds a predefined threshold. One or more scanned documents are created from portions of the captured image corresponding to the selected quadrangular objects, and the created scanned documents include corrections for perspective distortions of the selected quadrangular objects in the captured image.

20 Claims, 5 Drawing Sheets

(56) References Cited

U.S. PATENT DOCUMENTS

| | | |
|---|---|---|
| 2007/0024921 A1 | 2/2007 | Ohta |
| 2007/0132862 A1 | 6/2007 | Akasawa |
| 2007/0175998 A1 | 8/2007 | Lev |
| 2007/0223817 A1* | 9/2007 | Ulrich et al. ............... 382/199 |
| 2008/0239132 A1 | 10/2008 | Kohama |
| 2009/0175537 A1* | 7/2009 | Tribelhorn et al. .......... 382/173 |
| 2009/0185738 A1 | 7/2009 | Nepomniachtchi |
| 2010/0020221 A1 | 1/2010 | Tupman et al. |
| 2010/0027863 A1* | 2/2010 | Venkataraman et al. ..... 382/131 |
| 2010/0053410 A1 | 3/2010 | Yoshii et al. |
| 2010/0091104 A1 | 4/2010 | Sprigle et al. |
| 2011/0033118 A1* | 2/2011 | Yildiz et al. ............... 382/199 |
| 2011/0069180 A1 | 3/2011 | Nijemcevic |

OTHER PUBLICATIONS

"Ricoh Caplio R7 Digital Camera with Skew Correction Feature", Retrieved from: <http://www.ricoh.com/technology/tech/015.html> on Jul. 31, 2009, 2 pages.

"ScanR Solution for Digital Cameras or Mobile Phones", Retrieved from: <www.scanr.com/> on Jul. 31, 2009, 2 pages.

Hirzer, Martin "Marker Detection for Augmented Reality Applications", *Seminar/Project Image Analysis*, Available at <http://studierstube.icg.tu-graz.ac.at/thesis/marker_detection.pdf.>,(Oct. 27, 2008), pp. 1-25.

Jagannathan, L. et al., "Perspective Correction Methods for Camera-Based Document Analysis", Available at <http://www.iiit.net/techreports/2007_107.pdf.>,(2005), pp. 148-154.

* cited by examiner

CAMERA-BASED SCANNING

RELATED APPLICATION

This application is a continuation of and claims priority to U.S. patent application Ser. No. 12/578,445, filed on Oct. 13, 2009, which claims the benefit of U.S. Provisional Application Ser. No. 61/245,278 filed Sep. 23, 2009, the disclosures of which are incorporated by reference herein in their entirety.

BACKGROUND

Computing devices that include cameras are increasingly more common and mobile, such as laptop computers, tablet PCs, digital camera devices, mobile phones, ultra-mobile PCs, as well as other mobile data, messaging, and/or communication devices. Users may make use of cameras associated with computing devices to take various pictures including capturing images of presentations, whiteboards, business cards, documents, sketches, paintings, and so forth. The users may then be able to refer to the captured images to recall information contained therein such as diagrams, pictures, lists and other text, and so forth. Often, the users would like to be able to make use of information from captured images in their own documents, notes, and/or presentations. Traditionally, however, images captured by a camera are static and extracting electronically usable and/or editable information from the static images may not be straightforward.

A traditional technique utilized to generate a scanned version of a captured image involves obtaining a print of the image and then manually operating a scanner to create a scanned version of the image. Another traditional technique used to work with a captured image entails transferring the image from a capture device to a desktop computer and then using an image editing application of the desktop computer to further process the image. Such manually intensive techniques traditionally employed to obtain information contained in captured images may be inconvenient and time consuming for the user.

SUMMARY

This summary is provided to introduce simplified concepts of camera-based scanning. The simplified concepts are further described below in the Detailed Description. This summary is not intended to identify essential features of the claimed subject matter, nor is it intended for use in determining the scope of the claimed subject matter.

Embodiments of camera-based scanning are described. In various embodiments, scanned documents can be created using images captured by a camera associated with a device. An image captured by the camera is processed to identify quadrangular portions within the image that correspond to rectangular objects such as paper, business cards, whiteboards, screens, and so forth. One or more of these quadrangular portions can be selected for scanning automatically based on a scoring scheme and/or semi-automatically with the aid of input from a user. One or more scanned documents are created from the selected quadrangular portions by un-warping the selected portions to remove effects of perspective (e.g., rectify the portions to rectangles) and applying various image enhancements to improve appearance.

BRIEF DESCRIPTION OF THE DRAWINGS

Embodiments of camera-based scanning are described with reference to the following drawings. The same numbers are used throughout the drawings to reference like features and components.

DETAILED DESCRIPTION

Embodiments of camera-based scanning provide techniques for a user of a suitably configured computing device to scan documents, presentations, and other subjects using images captured by a camera associated with the device. Camera-based scanning can correct for the effects of perspective on rectangular objects such as paper, business cards, whiteboards, screens, and so forth.

For example, a user can aim the camera of a portable device towards a subject and initiate a capture of an image of the subject using a button, touch, or other suitable input. When the capture is initiated by the user, a capture operation can occur to capture an image of the subject. The image capture can initiate various processing of the captured image to create one or more scanned documents from the captured image. In an embodiment, a touch input or touch event on a touch-screen can be initiated to indicate both an area of interest and that the image capture should occur. The location of the touch input can be used in subsequent processing steps to guide a scoring function. This processing can include identifying quadrangles within the captured image to be considered as potential portions for scanning. The device may be configured to select one or more of the identified quadrangles automatically based on a scoring scheme, and/or semi-automatically with the aid of input from the user. One or more scanned documents can then be created by un-warping the selected quadrangles to remove effects of perspective (e.g., rectify the quadrangles to rectangles) and by applying various image enhancements to improve appearance.

While features and concepts of the described systems and methods for camera-based scanning can be implemented in any number of different environments, systems, and/or various configurations, embodiments of camera-based scanning are described in the context of the following example systems and environments.

Figure 1:
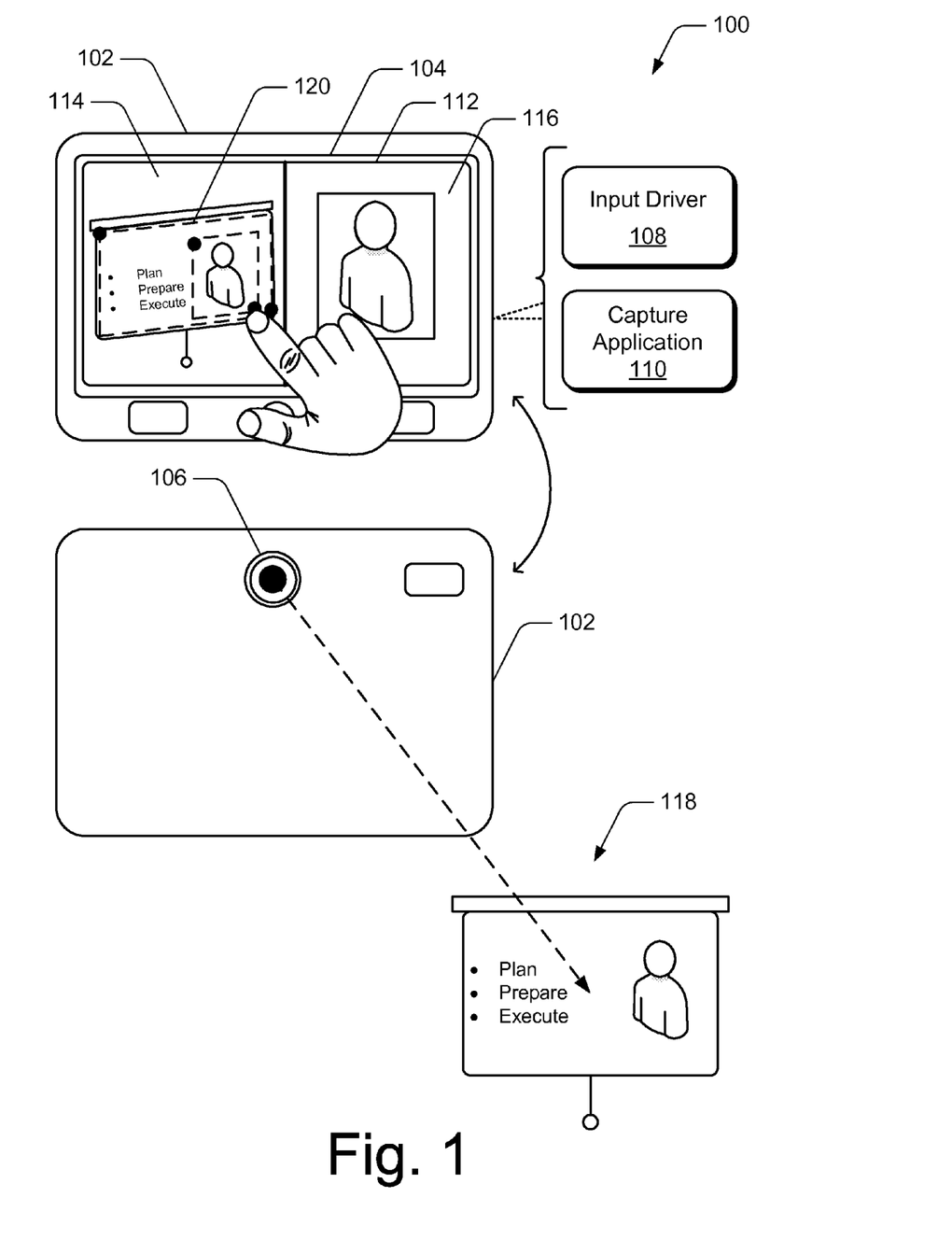
FIG. 1 illustrates an example of a device that can implement various embodiments of camera-based scanning.

FIG. 1 illustrates an example 100 of a computing device 102 that can implement various embodiments of camera-based scanning. The computing device 102 is an example of various types of devices including example portable devices described with reference to FIG. 2 and can also be implemented with any number and combination of differing components as described with reference to the example device shown in FIG. 4. The computing device 102 includes an integrated display screen 104 to display user interfaces, user interface elements and features, user-selectable controls, various displayable objects, and the like. The computing device 102 also includes a camera 106 to capture digital images. In the depicted example, the camera 106 is shown on a side of the computing device 102 opposite from the display screen 104.

The computing device 102 further includes at least an input driver 108 to process various inputs from a user to operate the computing device 102. In at least some embodiments, the display screen 104 is a touch-screen and the input driver 108 is operable to detect and process a variety of touch inputs and/or touch events. In an embodiment, a touch input or touch event on the touch-screen 104 can be initiated to indicate both an area of interest and to initiate an image capture. An image can be displayed on the display screen as a preview of the image to be captured, and a touch event at a particular location on the screen indicates that the image should be captured. Additionally, the particular location is identified as being of interest to a scoring function in subsequent processing algorithms. Accordingly, a touch input can be utilized to select part of an image and to initiate the camera taking a picture to capture the image.

The computing device 102 also includes a capture application 110 to initiate display of a user interface 112 and the various user interface elements, features, and controls to facilitate capturing images via the camera 106 and processing of the images. Further, the capture application 110 represents functionality of the computing device 102 to implement camera-based scanning techniques described herein. The example user interface 112 is illustrated as a split-screen interface having a viewfinder 114 and a scanned image display 116. The viewfinder 114 can present current images from the camera 106 and switch to present a captured image when a picture is taken. Further, a user may be able to modify and select portions of a captured image via interaction with the viewfinder 114.

The scanned image display 116 can present one or more portions of the captured image that are processed by the capture application 110 to produce scanned documents. The split-screen enables simultaneous display of a captured image in the viewfinder 114 and a scanned document produced from the captured image in the scanned image display 116. In this manner, a user can see both a captured image and a scanned portion of the image, and can intuitively make adjustments using the user interface 112, such as modifying boundaries of a selected portion or selecting a different portion.

In an embodiment of camera-based scanning, a user of a computing device 102 can initiate camera-based scanning by taking a picture of a subject 118. The subject 118 of the picture can include one or more rectangular objects such as a document, paper, business card, photo, whiteboard, and so forth. In the example of FIG. 1, the subject 118 appears as a display screen that is being used for a business presentation. When a picture is taken to initiate camera-based scanning, capture application 110 captures an image of the subject 118 and can output the image in the viewfinder 114 of the user interface 112.

Capture application 110 is implemented to detect portions of the captured image that correspond to rectangular objects. In particular, capture application 110 can be configured to identify quadrangles within the captured image to be considered as potential regions for scanning. Quadrangles within an image can be identified using a variety of feature extraction techniques suitable to find arbitrary shapes within images and other documents.

In at least some embodiments, the capture application 110 includes or otherwise makes use of an edge detector operable to detect edges based upon visual differences, such as sharp changes in brightness. One example algorithm suitable for edge detection is Canny's algorithm. When edges have been identified, the edges may be joined into connected lines to form quadrangles. For instance, vertices (corners) can be identified through the edge detection and then the vertices can be connected to form quadrangles. This can involve, for example, application of a linear Hough transform to correct for imperfections in the detected edges and derive lines corresponding to the edges. Accordingly, a set of potential quadrangles can be derived using the detected edges and lines, where the lines are detected from similarly-oriented edges along a particular direction and are then combined to form the quadrangles.

Capture application 110 can cause indicators 120 to appear in the user interface 112 to represent quadrangles that are detected and/or selected within a captured image. For example, the captured image in the viewfinder 114 of FIG. 1 includes indicators 120 configured as points at vertices and dashed lines appearing along edges. Other indicators 120 are also contemplated, such as animated lines, color changes, flags, and so forth. Potential quadrangles can be presented via the viewfinder to enable a user to select one or more of the quadrangles for scanning.

In an implementation, the capture application 110 can be configured to automatically select one or more potential quadrangles to scan based upon a scoring scheme. The scoring scheme can rate potential quadrangles based upon a variety of criteria including for example size, location, recognition of content such as text and faces, and so forth. A highest scoring quadrangle can be selected automatically. In another example, any quadrangles that exceed a threshold score can be selected.

The capture application 110 can be further configured to implement semi-automatic selection of quadrangles when automatic selection fails to find suitable quadrangles and/or when a user initiates semi-automatic selection. To do so, automatically selected quadrangles, corners, and/or lines may be presented in the user interface 112 using indicators 120 as noted above. A user can then provide input to modify the automatically selected quadrangles, eliminate a quadrangle, define a custom quadrangle, and so forth.

In an implementation, the indicators 120 may be selectable by the user to modify a quadrangle, such as by dragging of a corner to reposition the corner. In another example, a user may define a custom quadrangle by selecting one corner through interaction with the user interface 112. The capture application 110 can be configured to automatically derive a corresponding quadrangle based upon the user selection of one corner. The user may also operate a select and drag tool of the user interface 112 to identify an area for a custom quadrangle. When the computing device 102 is touch-capable, a user may touch and drag directly on the display screen 104 to modify and define quadrangles. Other input devices may also be employed for semi-automatic selection of quadrangles including for example a stylus, mouse, direction keys, and/or other suitable input devices.

One or more scanned documents can then be created by un-warping the selected quadrangles to remove effects of perspective (e.g., rectify the quadrangles to rectangles) and applying various image enhancements to improve appearance. In particular, to perform the un-warping the capture application 110 can be implemented to detect and correct for distortions due to the perspective of a captured image. For instance, the capture application 110 can determine the perspective based upon angles and ratios of a selected quadrangle. The capture application 110 can crop the captured image to correspond to the selected quadrangle. The capture application 110 can then rotate, resize at least some portions, and otherwise make corrections to the cropped image to account for the perspective distortions and produce an un-warped image that is rectified to a rectangle.

Capture application 110 can also apply various image enhancements to improve appearance of the un-warped image. Examples of these image enhancements include color enhancements, corrections for lighting and shadows, and background removal to name a few. The image enhancements may also include applying optical character recognition (OCR) to the un-warped image to identify text and produce scanned documents having editable text portions.

Consider the particular example of the business presentation shown in FIG. 1. The business presentation appears on a display screen and includes text and an illustration of a person. When a user takes a picture of the business presentation, an image is captured and can appear in the viewfinder 114. Note that the image appears skewed due to the angle at which the picture is taken. Initially, capture application 110 can identify the screen boundaries using camera-based scanning techniques discussed herein. Accordingly, a quadrangle corresponding to the screen is identified in the viewfinder 114 using indicators 120. Further, capture application 110 could initially present a scanned version of the screen including the text and illustration via the scanned image display 116.

In the depicted example, however, the user has selected a custom quadrangle to choose the illustration without the text. For instance, the user may touch the display screen 104 of the computing device 102 to pick a corner and/or drag a selection box around the illustration. Responsive to this selection, the selected portion (e.g., the illustration) has been scanned by un-warping to remove effects of perspective (e.g., the skew) and applying enhancements. The resulting scanned illustration appears in the scanned image display 116 and can be presented simultaneously with the captured business presentation in the viewfinder 114 using the split-screen of the user interface 112. The user may make use of the scanned illustration in a variety of ways, such as by adding annotations, sharing with colleagues, publishing on a website or blog, and so forth.

Figure 2:
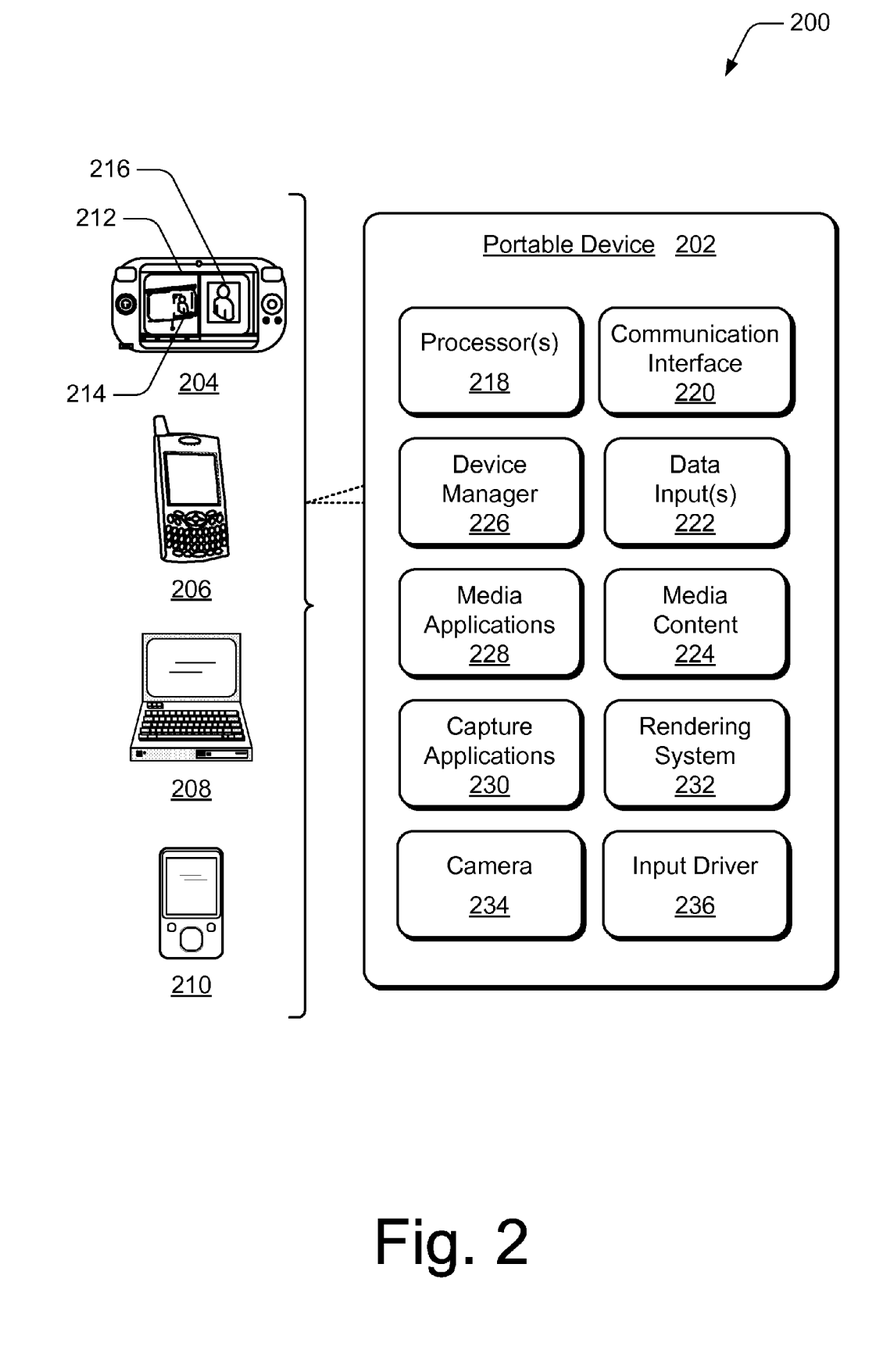
FIG. 2 illustrates an example system in which embodiments of camera-based scanning can be implemented.

FIG. 2 illustrates an example system 200 in which various embodiments of camera-based scanning can be implemented. Example system 200 includes a portable device 202 (e.g., a wired and/or wireless device) that can be any one or combination of a mobile personal computer 204, a personal digital assistant (PDA), a mobile phone 206 (e.g., cellular, VoIP, WiFi, etc.) that is implemented for data, messaging, and/or voice communications, a portable computer device 208 (e.g., a laptop computer, a laptop computer with a touch-screen, etc.), a media device 210 (e.g., a personal media player, portable media player, etc.), a gaming device, an appliance device, an electronic device, and/or any other type of portable device that can receive, display, and/or communicate data in any form of audio, video, and/or image data.

Each of the various portable devices can include an integrated display and/or an integrated touch-screen or other display, as well as selectable input controls via which a user can input data and/or selections. For example, mobile personal computer 204 includes an integrated touch-screen 212 on which a user interface 214 can be displayed that includes displayable objects and/or user interface elements 216, such as any type of image, graphic, text, selectable button, user-selectable control, menu selection, map element, and/or any other type of user interface displayable feature or item. The user interface 214 can also display captured and scanned images via a split-screen in accordance with one or more embodiments of camera-based scanning described herein.

Any of the various portable devices described herein can be implemented with one or more sensors, processors, communication components, data inputs, memory components, storage media, processing and control circuits, and/or a content rendering system. Any of the portable devices can also be implemented for communication via communication networks that can include any type of a data network, voice network, broadcast network, an IP-based network, and/or a wireless network that facilitates data, messaging, and/or voice communications. A portable device can also be implemented with any number and combination of differing components as described with reference to the example device shown in FIG. 4. A portable device may also be associated with a user (i.e., a person) and/or an entity that operates the device such that a portable device describes logical devices that include users, software, and/or a combination of devices.

In this example, portable device 202 includes one or more processors 218 (e.g., any of microprocessors, controllers, and the like), a communication interface 220 for data, messaging, and/or voice communications, and data inputs 222 to receive media content 224. Media content (e.g., to include recorded media content) can include any type of audio, video, and/or image data received from any media content or data source, such as messages, television media content, music, video clips, data feeds, interactive games, network-based applications, and any other content. Portable device 202 is implemented with a device manager 226 that includes any one or combination of a control application, software application, signal processing and control module, code that is native to the particular device, and/or a hardware abstraction layer for the particular device.

Portable device 202 includes various software and/or media applications 228 that may incorporate components such as capture applications 230 that can be processed or otherwise executed by the processors 218. The media applications 228 can include a music and/or video player, an imaging application, a Web browser, an email application, a messaging application, a digital photo application, and the like. Portable device 202 includes a rendering system 232 to render user interfaces from the capture applications 230 to generate a display on any of the portable devices. The rendering system 232 is also implemented to receive and render any form of audio, video, and/or image data received from any media content and/or data source. Portable device 202 also includes a camera 234 and an input driver 236 that can incorporate or otherwise make use of a touch-screen driver for the touch-screen 212. The input driver 236 can be configured to detect and process various inputs and/or determinable representations of gestures, inputs, and/or motions to operate functionality of the portable device 202 including operation of a capture application 230 to implement camera-based scanning. Implementations of a capture application 230 and the input driver 236 are described with reference to the capture application 110 and input driver 108 shown in FIG. 1, and with reference to embodiments of camera-based scanning as described herein.

Example methods 300 and 400 are described with reference to respective FIGS. 3 and 4 in accordance with one or more embodiments of camera-based scanning. Generally, any of the functions, methods, procedures, components, and modules described herein can be implemented using hardware, software, firmware, fixed logic circuitry, manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The methods may also be practiced in a distributed computing environment by processing devices that are linked through a communication network. In a distributed computing environment, computer-executable instructions may be located in both local and remote computer storage media and/or devices. Further, the features described herein are platformindependent and can be implemented on a variety of computing platforms having a variety of processors.

Figure 3:
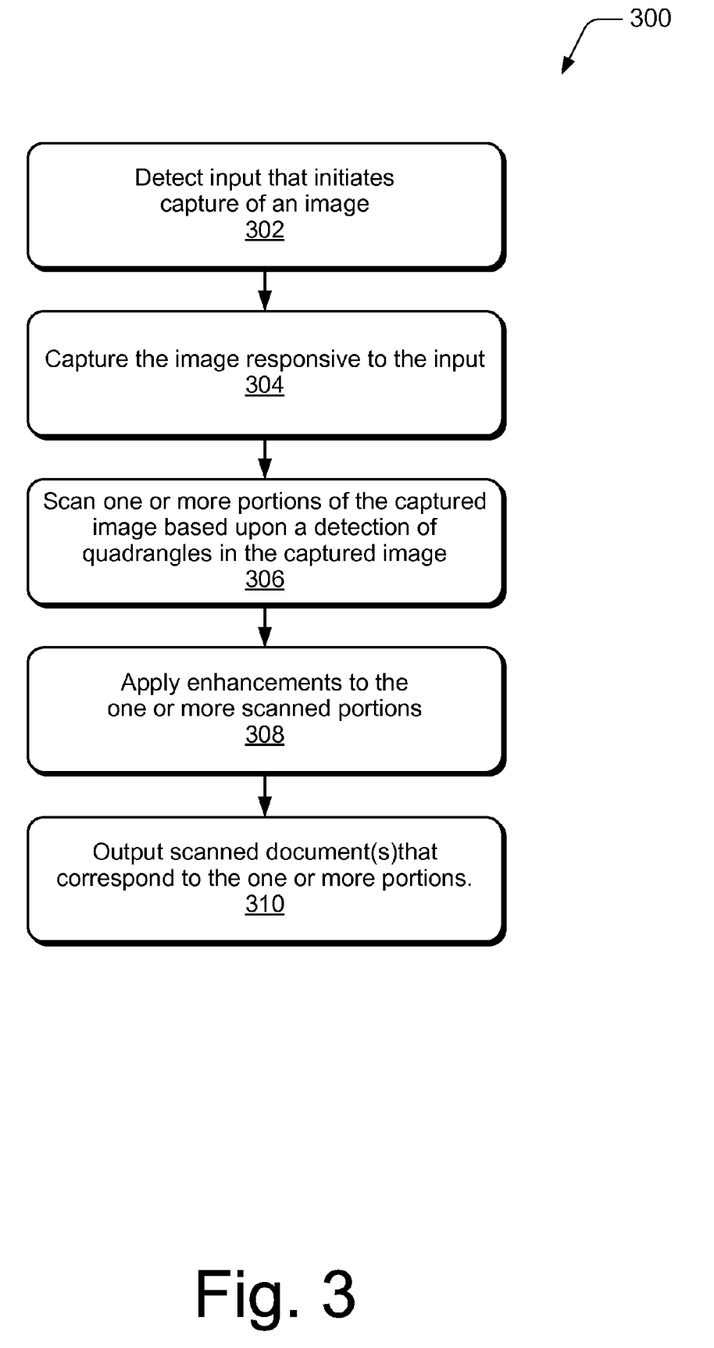
FIG. 3 illustrates example method(s) for camera-based scanning in accordance with one or more embodiments.

FIG. 3 illustrates example method(s) 300 of camera-based scanning. The order in which the method is described is not intended to be construed as a limitation, and any number of the described method blocks can be combined in any order to implement the method, or an alternate method.

At block 302, an input is detected that initiates capture of an image. For example, the input driver 108 at computing device 102 detects a user selection to take a picture of a subject 118. The subject 118 can include one or more rectangular objects that are detectable for camera-based scanning. The capture may be initiated by user manipulation of a touch screen button, a key stroke, operation of a dedicated shutter button of the computing device 102, or another suitable input.

At block 304, an image is captured responsive to the input. For example, capture application 110 at computing device 102 can capture an image of the subject 118 using the camera 106 responsive to the input at block 302. The captured image can be presented via a user interface 112 of the computing device 102.

At block 306, one or more portions of the captured image are scanned based upon detection of quadrangles in the captured image. At block 308, enhancements are applied to the one or more scanned portions. Quadrangles can be detected in the captured image using a variety of techniques. For example, capture application 110 at computing device 102 can identify quadrangles using either or both of automatic and semi-automatic techniques discussed in relation to FIG. 1. In another example, a manual technique can be employed in which the captured image can be presented to a user via the computing device 102 to manually select quadrangles. In this example, functionality to enable automatic detection of quadrangles via the capture application 110 may be disabled, may not be included, or may be otherwise unavailable. Various enhancements to improve appearance of the one or more scanned portions are contemplated. Further details regarding techniques to detect quadrangles and enhance scanned images are provided below with reference to example method(s) 400 shown in FIG. 4.

At block 310, scanned documents that correspond to one or more portions are output. For example, the capture application 110 at computing device 102 can cause a scanned document to be presented in a scanned document display of a user interface 112. A user may then be able to work with the scanned document such as by saving the document, adding annotations, sending the document to one or more recipients, and so forth.

Figure 4:
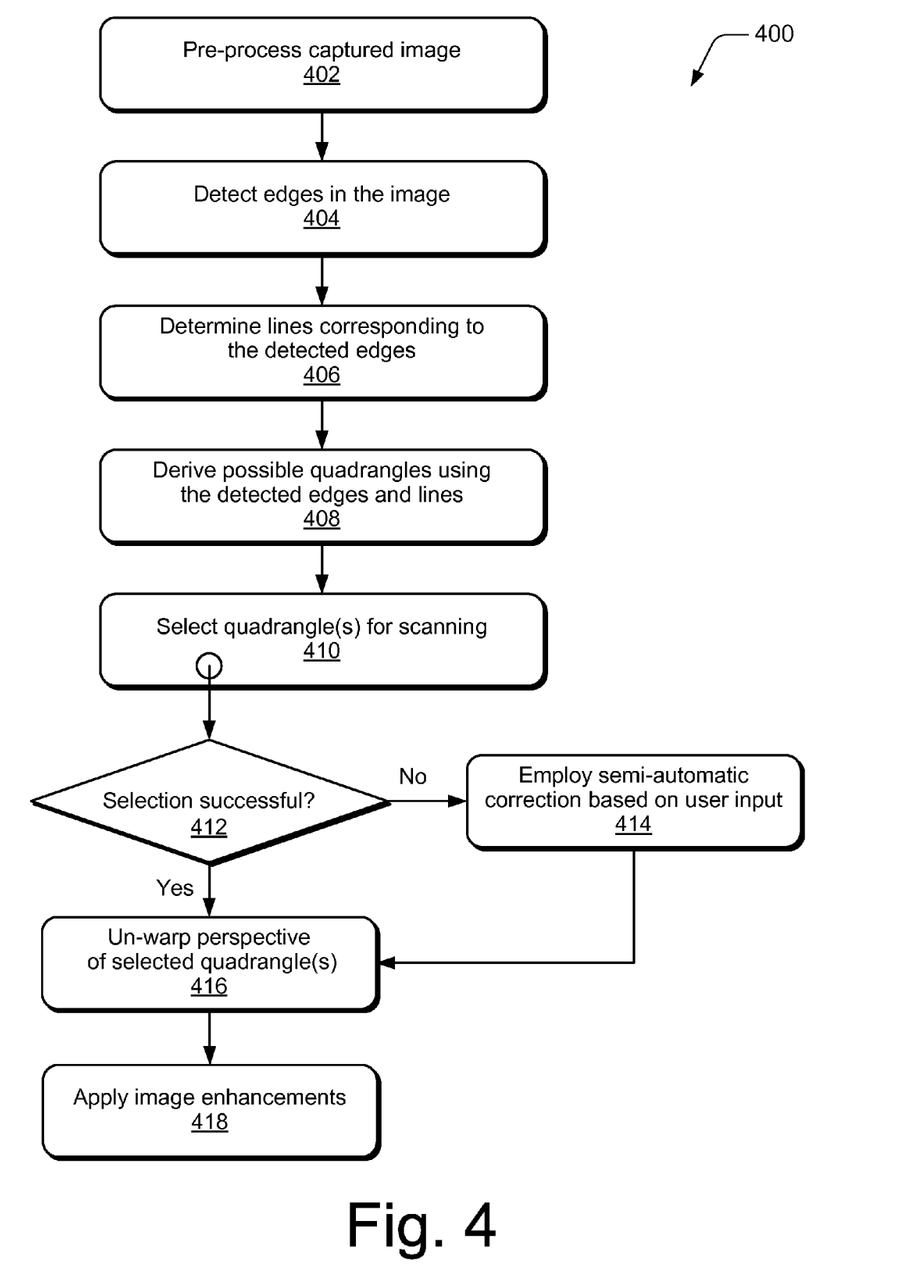
FIG. 4 illustrates other example method(s) for camera-based scanning in accordance with one or more embodiments.

FIG. 4 illustrates example method(s) 400 of camera-based scanning. In particular, FIG. 4 represents an example algorithm that is suitable to scan images captured via a camera 106 of a computing device 102. The order in which the method is described is not intended to be construed as a limitation, and any number of the described method blocks can be combined in any order to implement the method, or an alternate method.

At block 402, a captured image is pre-processed. For example, capture application 110 of a computing device 102 can pre-process captured images in various ways to prepare the images for camera-based scanning. By way of example, pre-processing can include applying image filters, enhancing contrast, adjustments to brightness, down scaling, GS conversion, median filtering, and so forth. In an embodiment, pre-processing includes one or more of down-scaling the image, contrast enhancement, and noise filtering. The down-scaling can occur to reduce a resolution of the image and the number of pixels to process for the image. As resolution in an image is increased, more computing resources are consumed to process the image and more false (e.g., unwanted) edges can result from edge detection. Accordingly, down-scaling can speed up processing and enable improved edge detection.

Contrast enhancement can be employed to set the lightest tones in the image to white and the darkest tones to black. This can also improve detection of edges and lines through detection algorithms that find sharp differences in contrast and/or brightness. Noise filtering involves applying one or more filters to remove image noise. Some noise filters, such as Gaussian blur, can degrade (e.g., soften) edges of images, and make it more difficult to detect the edges. Accordingly, noise filtering techniques that preserve edges, such as bilateral and/or median filtering, can be employed with camera-based scanning techniques to prevent edge degradation.

Following pre-processing, method 400 can proceed to perform detection of quadrangles in the captured image. At block 404, edges are detected in the captured image. Edges that are detected can correspond to borders of rectangular objects within an image such as edges of a business card, a frame of a painting, edges of a display screen, and so forth. The edges can be detected in any suitable way. For example, capture application 110 of a computing device 102 can be implemented to apply Canny's algorithm to detect edges based on sharp changes in contrast.

Canny's algorithm can make use of a configurable threshold that defines an amount of contrast difference that is sufficient to detect an edge. In an embodiment, thresholds used with Canny's algorithm can be adaptive. For instance, thresholds for areas of an image that have high instances of edges (e.g., carpet, a table, or other textured surface) can be increased. This can reduce a number of false edges detected in such areas. Likewise, thresholds for areas of the image that have relatively low instances of edges can be decreased to increase the chances of detecting edges that have relatively small contrast differences.

At block 406, lines are determined that correspond to the detected edges. Capture application 110 can make use of detected edges to construct corresponding lines. In an implementation, lines are determined by applying a linear Hough transform. Lines can be identified to correct for imperfections that occur in detection of edges, such as incomplete edges, wavy edges, and so forth. This step can also involve scoring lines according to a scoring scheme and selectively discarding lines based on scoring criteria. For instance, isolated lines, lines that are uncertain, and lines determined not to form suitable quadrangles can be discarded or ignored.

A variety of techniques to score and select lines are contemplated. In an embodiment, a scoring refinement can be applied to a configurable number of top-scoring lines that are determined by application of the Hough transform. In particular, each of the top scoring lines can be re-scored and re-sorted by scanning an area surrounding a line to find edges having a similar orientation. The new score for a particular line is proportional to the number of similarly oriented edges found in the scanned area.

In an embodiment, the area scanned for a particular line can be adjusted based upon the orientation of the line. For instance, for a line that is substantially horizontal, the scanned area can include a configurable number of pixels above/below pixels of the line. Similarly, for a line that is substantially vertical, the scanned area can include a configurable number of pixels to the left/right of pixels of the line.

At block 408, possible quadrangles are derived using the detected edges and lines. In particular, a capture application 110 of a computing device 102 can make use of the edges detected at block 404 and lines determined at block 406 to construct possible quadrangles. In other words, various lines can be combined to form quadrangles, where the lines are detected from similarly-oriented edges along a particular direction. Combining the lines to form quadrangles can occur in a variety of ways. In an example, detected lines can be processed first to find possible quadrangles based upon finding lines that form opposite sides of a quadrangle. Detected lines can be processed again to find possible quadrangles based upon lines that form quadrangle corners. Unlike some previous techniques, corners can correspond to irregular or skewed quadrangles, as well as to corners that form substantially right angles.

At block 410, a quadrangle is selected for scanning. For instance, using the set of possible quadrangles constructed in block 408, the capture application 110 can be configured to automatically select a quadrangle according to scoring criteria. This step can involve identifying meaningful combinations of lines based upon a scoring scheme and discarding combinations that are considered un-meaningful. The scoring scheme can account for various criteria including location in the image, relative size, content contained within and outside of quadrangles, and so forth.

The scoring scheme can be employed by the capture application 110 to select the likely quadrangle from among the possible quadrangles. In other words, the capture application 110 can score the possible quadrangles using the criteria to make a likely or approximately best-guess as to the intended subject of the captured image. For example, a large quadrangle near the center of the captured image is likely to be an intended subject and can be selected by the capture application 110 based upon the scoring. In contrast, a small quadrangle located away from the center and having little or no variations in color is likely not a meaningful quadrangle and can be discarded.

Various heuristics can be employed in order to find an optimal quadrangle. In an embodiment, the scoring-scheme can compute an initial score for a particular quadrangle and then, optionally, modify the initial score to account for various characteristics of the quadrangle that can increase or decrease the initial score. For example, an initial score can be computed based upon a relative size of a quadrangle. One way an initial score based on relative size can be computed is by dividing the quadrangle's area by the image's area and taking a square root of this value. Optionally, various characteristics of quadrangles can be considered to modify the initial score. For instance, the initial score can be modified with enhancements that increase the score and/or penalties that reduce the score.

In one particular example, the initial score can be multiplied by, or otherwise adjusted by, various penalty factors to account for "unwanted" quadrangle characteristics. For instance, penalty factors can be configured as multipliers in a range between 0 and 1. A variety of different penalties and corresponding penalty factors are contemplated. For example, a penalty can be applied when two lines of a quadrangle corner extend past the corner. The penalty factor can be proportional to how far the lines extend past the corner.

Another penalty can be based upon the angle formed between two lines at the corner of a quadrangle. A penalty factor in this case can be proportional to the angle's difference from a right angle. Other example penalties can be assessed for quadrangles that extend past borders of the image, quadrangles that are significantly skewed relative to the borders of the image, and/or quadrangles that are positioned far away from the center of the image or otherwise miss-aligned.

The initial score for a quadrangle can also be multiplied by, or otherwise adjusted by, various enhancement factors to account for "desired" quadrangle characteristics. For instance, example enhancements can be applied for quadrangles located near the center of the image, that are substantially aligned with the image, that are well-formed, and so forth. It is noted that enhancements and penalties described herein can be used individually and/or in combination to implement a scoring-scheme to select quadrangles.

At block 412, a determination is made as to whether the selection of the quadrangle is successful. For example, the capture application 110 can determine when a suitable quadrangle has been selected. In some cases, the automatic selection of quadrangles at blocks 404-410 can fail to detect suitable quadrangles. For instance, capture application 110 can determine that none of the possible quadrangles meet a defined scoring threshold. In this case, the selection is determined to be unsuccessful and semi-automatic correction can be initiated.

In another example, one or more quadrangles automatically selected at block 410 can be presented via a user interface 112 of a computing device 102 for approval by the user. The user may then provide input to approve or disapprove of the presented quadrangles. In this example, the determination at block 412 can be made according to the input provided by the user. If the user approves, then the selection is considered successful. If the user disapproves, the selection is determined to be unsuccessful and semi-automatic correction can be initiated.

If the selection is unsuccessful in the above scenarios, then at block 414, semi-automatic correction is employed based upon user input to select a quadrangle. Semi-automatic correction enables a user to provide input to modify the automatic selection that can be made by the capture application 110. For example, one or more quadrangles automatically selected at block 410 can be presented via a user interface 112 of a computing device 102. The presentation may make use of indicators 120 to show the quadrangle boundaries. In an implementation, at least some of the indicators 120 are selectable by touch or other suitable input to modify a corresponding quadrangle. Capture application 110 can detect interaction with the indicators 120 and cause corresponding modifications to quadrangles. For instance, a user may interact with the indicators 120 to make modifications such as resizing a quadrangle by selecting and dragging corner points (e.g., vertices), dragging to move the quadrangle to a different location, rotating the quadrangle, and so forth.

In addition or alternatively, a user may define a custom quadrangle by selecting one or more corners through interaction with the user interface 112. Again, this interaction can be by touch or other suitable input. The capture application 110 can be configured to automatically derive a corresponding quadrangle responsive to user interaction to select one corner using the techniques described herein. If the user is still unsatisfied with the quadrangle, the user can select another corner and the capture application 110 can use both selected corners to derive a corresponding quadrangle. The process can be repeated a third time by selection of a third corner. If the user is still unsatisfied and a fourth corner is selected, capture application 110 can output a quadrangle whose vertexes correspond to the four selected corners. In this way, a user is able to provide successive hints to adjust a quadrangle that is automatically selected by the capture application 110.

The user may also operate a select and drag tool of the user interface 112 to identify an area for a custom quadrangle. In FIG. 1, for example, interaction of a user to select the illustration of a person in the viewfinder 114 of the user interface 112 is depicted. Following the semi-automatic correction, method 400 proceeds to block 416.

At block 416, processing occurs to un-warp the perspective of the selected quadrangle. This step can occur both when the quadrangle selection is determined to be successful at block 412 and following semi-automatic correction at block 414. In general, un-warping is performed to produce an un-warped image corresponding to the selected quadrangle that is rectified to a rectangle. For instance, the capture application 110 can determine the perspective based upon angles and ratios of the selected quadrangle. The capture application 110 can also crop the captured image to correspond to the selected quadrangle. Further, the capture application 110 can correct the perspective by rotating, resizing portions, and otherwise making corrections to account for the perspective distortions.

At block 418, visual enhancements are applied to the un-warped image. Various enhancements can be applied by the capture application 110 to the un-warped image as discussed previously in relation to the foregoing figures.

Figure 5:
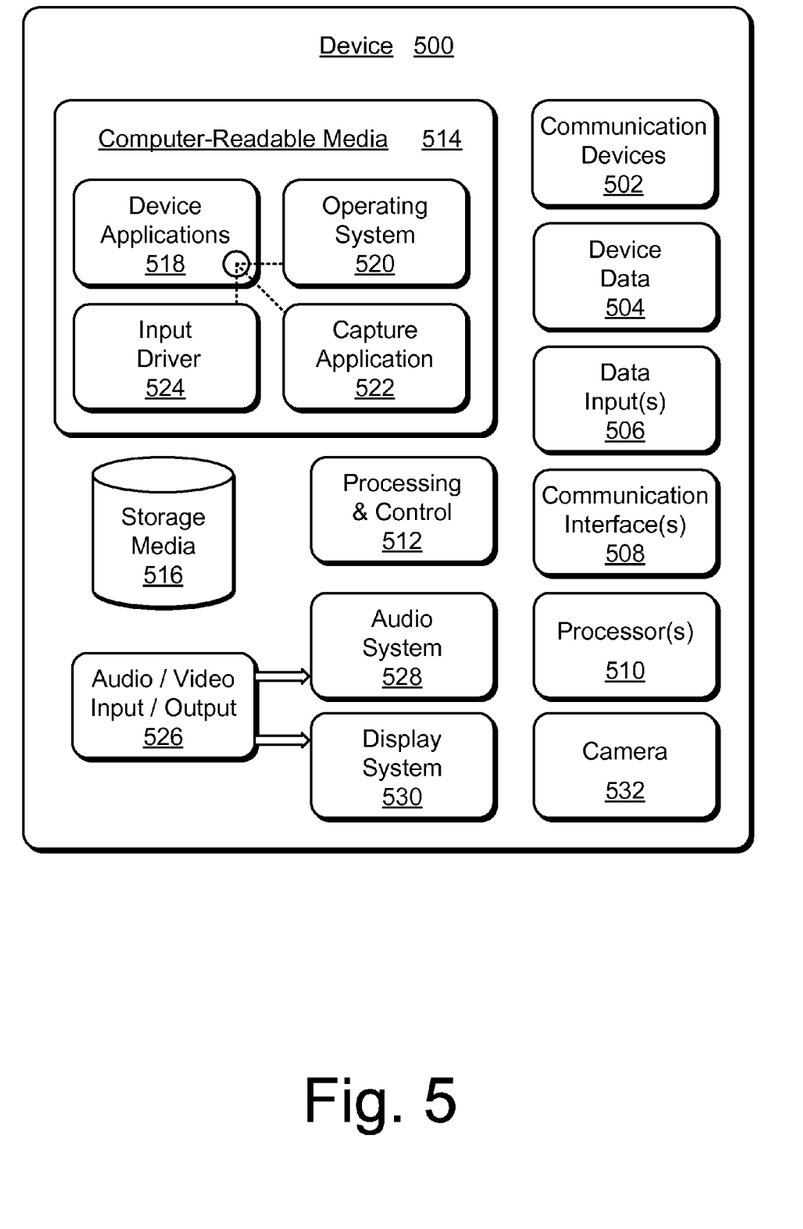
FIG. 5 illustrates various components of an example device that can implement embodiments of camera-based scanning.

FIG. 5 illustrates various components of an example device 500 that can be implemented as any type of portable and/or computer device as described with reference to FIGS. 1 and 2 to implement embodiments of camera-based scanning. Device 500 includes communication devices 502 that enable wired and/or wireless communication of device data 504 (e.g., received data, data that is being received, data scheduled for broadcast, data packets of the data, etc.). The device data 504 or other device content can include configuration settings of the device, media content stored on the device, and/or information associated with a user of the device. Media content stored on device 500 can include any type of audio, video, and/or image data. Device 500 includes one or more data inputs 506 via which any type of data, media content, and/or inputs can be received, such as user-selectable inputs, messages, music, television media content, recorded video content, and any other type of audio, video, and/or image data received from any content and/or data source.

Device 500 also includes communication interfaces 508 that can be implemented as any one or more of a serial and/or parallel interface, a wireless interface, any type of network interface, a modem, and as any other type of communication interface. The communication interfaces 508 provide a connection and/or communication links between device 500 and a communication network by which other electronic, computing, and communication devices communicate data with device 500.

Device 500 includes one or more processors 510 (e.g., any of microprocessors, controllers, and the like) which process various computer-executable instructions to control the operation of device 500 and to implement embodiments of camera-based scanning. Alternatively or in addition, device 500 can be implemented with any one or combination of hardware, firmware, or fixed logic circuitry that is implemented in connection with processing and control circuits which are generally identified at 512. Although not shown, device 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 500 also includes computer-readable media 514, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 500 can also include a mass storage media device 516.

Computer-readable media 514 provides data storage mechanisms to store the device data 504, as well as various device applications 518 and any other types of information and/or data related to operational aspects of device 500. For example, an operating system 520 can be maintained as a computer application with the computer-readable media 514 and executed on processors 510. The device applications 518 can include a device manager (e.g., a control application, software application, signal processing and control module, code that is native to a particular device, a hardware abstraction layer for a particular device, etc.). The device applications 518 also include any system components or modules to implement embodiments of camera-based scanning. In this example, the device applications 518 include a capture application 522 and an input driver 524 that are shown as software modules and/or computer applications. Alternatively or in addition, the capture application 522 and the input driver 524 can be implemented as hardware, software, firmware, or any combination thereof.

Device 500 also includes an audio and/or video input-output system 526 that provides audio data to an audio system 528 and/or provides video data to a display system 530. The audio system 528 and/or the display system 530 can include any devices that process, display, and/or otherwise render audio, video, and image data. Such devices can include at least a camera 532 to enable capturing video and images. Video signals and audio signals can be communicated from device 500 to an audio device and/or to a display device via an RF (radio frequency) link, S-video link, composite video link, component video link, DVI (digital video interface), analog audio connection, or other similar communication link. In an embodiment, the audio system 528 and/or the display system 530 are implemented as external components to device 500. Alternatively, the audio system 528 and/or the display system 530 are implemented as integrated components of example device 500. Likewise, the camera 532 can be implemented as an external or internal component of the device 500.

Although embodiments of camera-based scanning have been described in language specific to features and/or methods, it is to be understood that the subject of the appended claims is not necessarily limited to the specific features or methods described. Rather, the specific features and methods are disclosed as example implementations of camera-based scanning.

The invention claimed is:

1. A computing device comprising:
   a memory and a processor configured to execute instructions in the memory to implement a capture application, the capture application configured to:
   automatically select one or more quadrangular objects in a captured image for scanning by detecting edges in the captured image using a configurable threshold, the configurable threshold defining an amount of contrast difference sufficient to detect an edge and configurable for different portions of the image to increase in some areas of the captured image to reduce detection of false edges in the some areas and decrease in other areas of the captured image to increase edge detection within the other areas;
   determine that the automatic selection of the one or more quadrangular objects is successful based on the one or more quadrangular objects having an associated score that exceeds a predefined threshold; and
   create one or more scanned documents from portions of the captured image corresponding to the selected one or more quadrangular objects, the one or more scanned documents including corrections to the portions for perspective distortion of the one or more quadrangular objects in the captured image.

2. A computing device as recited in claim 1, wherein the capture application is further configured to automatically select the one or more quadrangular objects by at least:
determining the one or more quadrangular objects as combinations of the detected edges.

3. A computing device as recited in claim 2, wherein the capture application is further configured to:
employ Canny's algorithm to detect the edges and a Hough transform to form potential quadrangles from the detected edges; and
apply a scoring scheme to the potential quadrangles to determine the one or more quadrangular objects and identify the associated score of the one or more quadrangular objects.

4. A computing device as recited in claim 1, wherein the capture application is further configured to expose a user interface having a portion to display the captured image and another portion to concurrently display the one or more scanned documents created from the captured image.

5. A computing device as recited in claim 4, wherein the user interface is configured to:
present indicators within the captured image to identify the selected one or more quadrangular objects;
enable user interaction with the indicators to make a user modification to the selected one or more quadrangular objects; and
responsive to the user interaction with the indicators, update and display the one or more scanned documents created in accordance with the user modification.

6. A computing device as recited in claim 1, wherein the capture application is further configured to:
create the one or more scanned documents using the automatic selection when the automatic selection is successful; and
in an event that the automatic selection is unsuccessful, create the one or more scanned documents using quadrangular objects in the captured image selected through a semi-automatic correction.

7. A computing device as recited in claim 1, wherein the capture application is further configured to, in an event that the automatic selection is unsuccessful, employ semi-automatic correction by at least:
receiving a user input to select a location in the captured image; and
automatically deriving a corresponding quadrangle based upon the user input, the selected location being one corner of the corresponding quadrangle.

8. A computing device as recited in claim 1, wherein the capture application is further configured to apply one or more visual enhancements to improve an appearance of the one or more scanned documents.

9. A computing device as recited in claim 1, wherein the corrections to the portions for perspective distortions comprise rectification of each of the portions of the captured image to correspond to a rectangle.

10. A method comprising:
automatically selecting a portion of a captured image that corresponds to a rectangular object in the captured image based on the portion having an associated score that exceeds a predefined scoring threshold, the selecting including detecting edges within the captured image by applying a configurable threshold defining an amount of contrast difference usable to detect an edge and reconfigurable based on a number of potential edges in the portion of the captured image such that the configurable threshold is configured to increase to reduce false edge detection in the portion and decrease to increase edge detection in the portion according to the number of potential edges in the portion;
creating a scanned document from the portion of the captured image;
initiating a display of a user interface configured to present a split screen having the captured image on one side of the split screen and the scanned document created from the captured image on another side of the split screen;
enabling user interaction with the captured image via the one side of the split screen to modify the portion of the captured image; and
updating the scanned document displayed on the other side of the split screen to reflect a modification caused by the user interaction.

11. A method as recited in claim 10, wherein the image is captured via a camera of a computing device.

12. A method as recited in claim 10, further comprising:
determining lines corresponding to the detected edges;
deriving potential quadrangles by combining the detected edges and lines; and using the derived potential quadrangles for the automatic selection.

13. A method as recited in claim 12, wherein detecting the edges comprises applying an algorithm to find sharp changes of brightness corresponding to the edges.

14. Computer-readable media having stored thereon computer-executable instructions that, if executed by a computing device, initiate the computing device to:
identify at least one quadrangle in a captured image based upon a detection of one or more potential quadrangles in the captured image, the at least one quadrangle corresponding to a rectangular object in the captured image, edges for the one or more potential quadrangles being detected in the captured image using a configurable threshold, the configurable threshold defining an amount of contrast difference sufficient to detect an edge and configurable for different portions of the image to increase in some areas of the captured image to reduce detection of false edges in the some areas and decrease in other areas of the captured image to increase edge detection within the other areas;
conduct an automatic selection of the at least one quadrangle for scanning from the captured image;
determine that the automatic selection is successful based on the selected at least one quadrangle having an associated score that exceeds a predetermined threshold; and
based on the automatic selection being successful, process the captured image to produce a scanned document corresponding to the selected at least one quadrangle.

15. Computer-readable media as recited in claim 14, wherein the computer-executable instructions, if executed by the computing device, cause the computing device to perform the detection of the one or more potential quadrangles by at least:
determining lines corresponding to the detected edges; and
deriving the one or more potential quadrangles by combining the detected edges and the determined lines.

16. Computer-readable media as recited in claim 15, wherein detecting the edges comprises applying an algorithm to find sharp changes of brightness corresponding to the edges.

17. Computer-readable media as recited in claim 15, wherein determining lines corresponding to the detected edges comprises applying a linear transform to correct imperfections in the detected edges.

18. Computer-readable media as recited in claim 14, wherein the automatic selection is conducted by at least applying a scoring scheme to the one or more potential quadrangles detected in the captured image that accounts for at least a location of the one or more potential quadrangles in the captured image and relative size of the one or more potential quadrangles in the captured image.

19. Computer-readable media as recited in claim 14, wherein the captured image is processed to produce the scanned document by at least:
- cropping the captured image to provide a cropped image that corresponds to the at least one quadrangle;
- un-warping the cropped image to correct for perspective distortions; and
- applying one or more visual enhancements to the cropped image.

20. Computer-readable media as recited in claim 14, wherein the computer-executable instructions, if executed by the computing device, cause the computing device to output a user interface having a portion to display the captured image and another portion to concurrently display the scanned document produced by processing the captured image.

* * * * *